US011498447B2

(12) United States Patent
Salter et al.

(10) Patent No.: US 11,498,447 B2
(45) Date of Patent: Nov. 15, 2022

(54) VEHICLE TO VEHICLE CHARGE CABLE ACQUISITION

(71) Applicant: FORD GLOBAL TECHNOLOGIES, LLC, Dearborn, MI (US)

(72) Inventors: Stuart C. Salter, White Lake, MI (US); Katherine Howard-Cone, Plymouth, MI (US); Justin Carmen Campanaro, Ferndale, MI (US); Farshad Harirchi, Ann Arbor, MI (US); Devang Bhalchandra Dave, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 17/131,151

(22) Filed: Dec. 22, 2020

(65) Prior Publication Data
US 2022/0194253 A1   Jun. 23, 2022

(51) Int. Cl.
  *B60L 53/66*    (2019.01)
  *B60L 53/65*    (2019.01)
  *B60L 53/18*    (2019.01)

(52) U.S. Cl.
  CPC ............. *B60L 53/66* (2019.02); *B60L 53/18* (2019.02); *B60L 53/65* (2019.02); *B60L 2240/70* (2013.01); *Y04S 30/12* (2013.01); *Y04S 30/14* (2013.01)

(58) Field of Classification Search
  CPC .......... B60L 53/66; B60L 53/18; B60L 53/65; B60L 2240/70; H02J 7/342; Y02S 30/12; Y02S 30/14
  See application file for complete search history.

(56) References Cited

U.S. PATENT DOCUMENTS

| | | | |
|---|---|---|---|
| 8,615,355 B2 | 12/2013 | Inbarajan et al. | |
| 10,185,977 B2* | 1/2019 | Khoo | ................. G06Q 30/0206 |
| 2012/0007553 A1* | 1/2012 | Ichikawa | ............... G07C 5/085 |
| | | | 320/109 |
| 2013/0175973 A1 | 7/2013 | Jones et al. | |
| 2021/0074094 A1* | 3/2021 | Schumacher | ...... G07C 9/00309 |

* cited by examiner

*Primary Examiner* — David V Henze-Gongola
(74) *Attorney, Agent, or Firm* — David B Kelley; Brooks Kushman P.C.

(57) ABSTRACT

A vehicle includes a controller that sends a charge request defining a charge location to a charge donor vehicle for vehicle-to-vehicle charging, responsive to not detecting a charge cable that satisfies the charge request in the vehicle and the charge donor vehicle, sends a borrow request including the charge location to a charge cable donor vehicle, and responsive to confirmation from the charge donor vehicle and charge cable donor vehicle, directs the vehicle to drive to the charge location.

18 Claims, 4 Drawing Sheets

VEHICLE TO VEHICLE CHARGE CABLE ACQUISITION

TECHNICAL FIELD

The present disclosure relates to a vehicle-to-vehicle (V2V) charging system.

BACKGROUND

Electric vehicles (EVs) have become increasingly popular. An EV uses a high-voltage direct current (DC) battery (traction battery) connected to an electric machine to provide propulsion power. The traction battery may be recharged at a high-voltage DC charging station. Alternatively, some EVs may be charged via an alternating current (AC) power outlet such as a home power outlet.

SUMMARY

A vehicle includes traction battery and a controller. The controller, responsive to detecting a state-of-charge of the traction battery being less than a threshold, sends a charge request defining a charge location to a charge donor vehicle for vehicle-to-vehicle charging, responsive to not detecting a charge cable that satisfies the charge request in the vehicle and the charge donor vehicle, sends a borrow request including the charge location to a charge cable donor vehicle, and responsive to confirmation from the charge donor vehicle and charge cable donor vehicle, directs the vehicle to drive to the charge location.

A method includes sending a charge request defining a charge location to a charge donor vehicle for vehicle-to-vehicle charging, sending a borrow request including the charge location to a charge cable donor vehicle for charge cable acquisition, receiving confirmation that the charge request and borrow request have been accepted, and directing a vehicle to drive to the charge location.

A power system for a vehicle includes a controller that sends a charge request defining a charge location and a charge cable requirement to a charge donor vehicle for vehicle-to-vehicle charging, sends a borrow request to a charge cable donor vehicle after acceptance of the charge request by the charge donor vehicle and indication of lack of availability of a charge cable that can satisfy the charge cable requirement, and directs the vehicle to drive to the charge location after acceptance of the borrow request by the charge cable donor vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
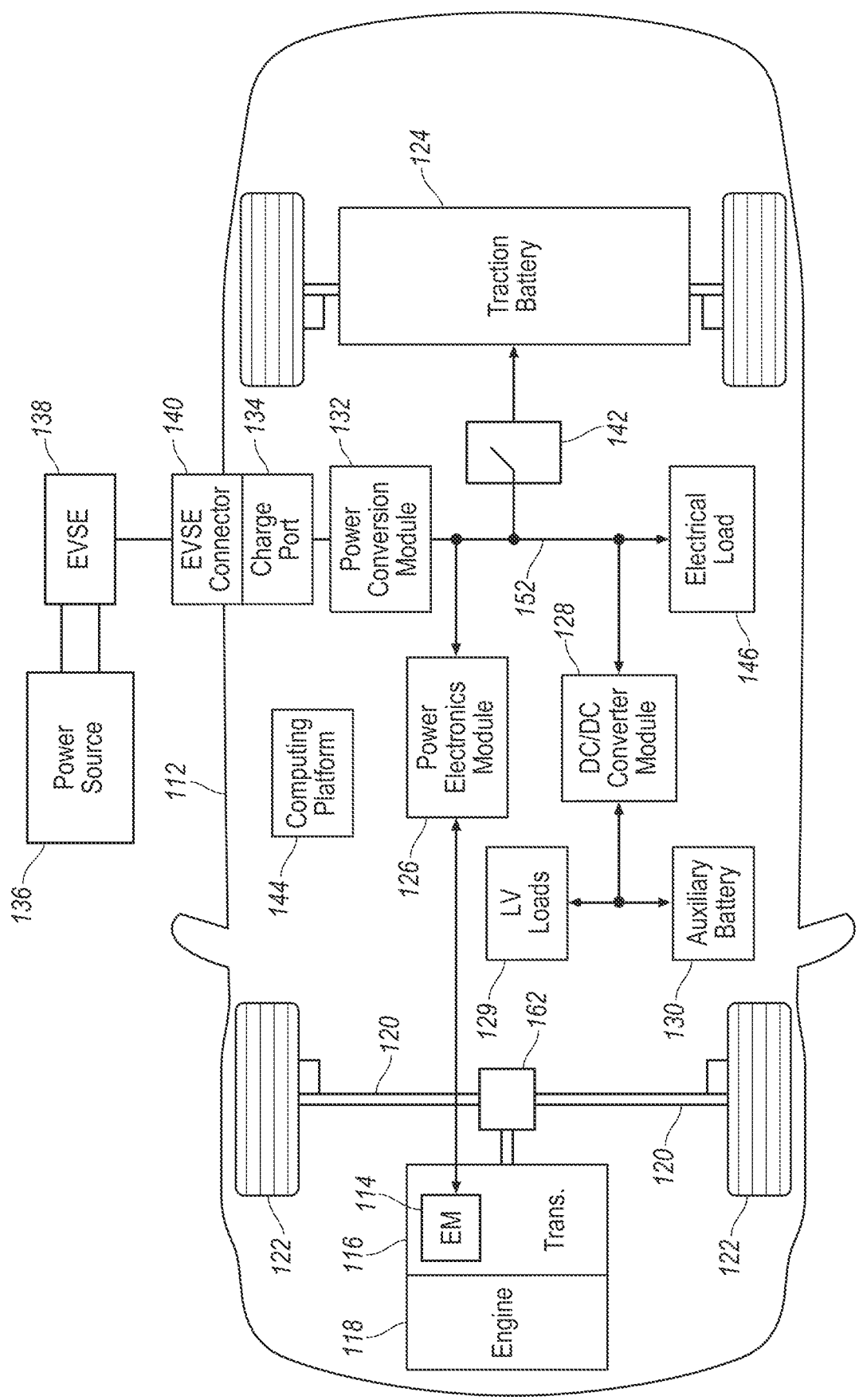
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV), a battery electric vehicle (BEV), and/or full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a BEV. In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads 129. An output of the DC/DC converter module 128 may be electrically coupled to an auxiliary battery 130 (e.g., 12V battery) for charging the auxiliary battery 130. The low-voltage systems may be electrically coupled to the auxiliary battery 130.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. In an alternative example, the external power source 136 may be a traction battery of a donor vehicle and the EVSE 138 may be a V2V charging cable (to be discussed in detail below). The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the charge port 134 may be configured to output DC electric power from the traction battery 124 through the power conversion module 132. One or more contactors 142 may isolate the traction battery 124 from other components when opened and connect the traction battery 124 to other components when closed.

Electronic modules/controllers in the vehicle 112 may communicate via one or more vehicle networks (to be described in detail below). The vehicle network may include a plurality of channels for communication. Channels of the vehicle network may include discrete connections between modules and may include power signals from the auxiliary battery 130. Different signals may be transferred over different channels of the vehicle network. For example, video signals may be transferred over a high-speed channel while control signals may be transferred over a low speed channel. The vehicle network may include any hardware and software components that aid in transferring signals and data between modules. A computing platform 144 may be present to perform and coordinate various operations of the vehicle 112.

Figure 2:
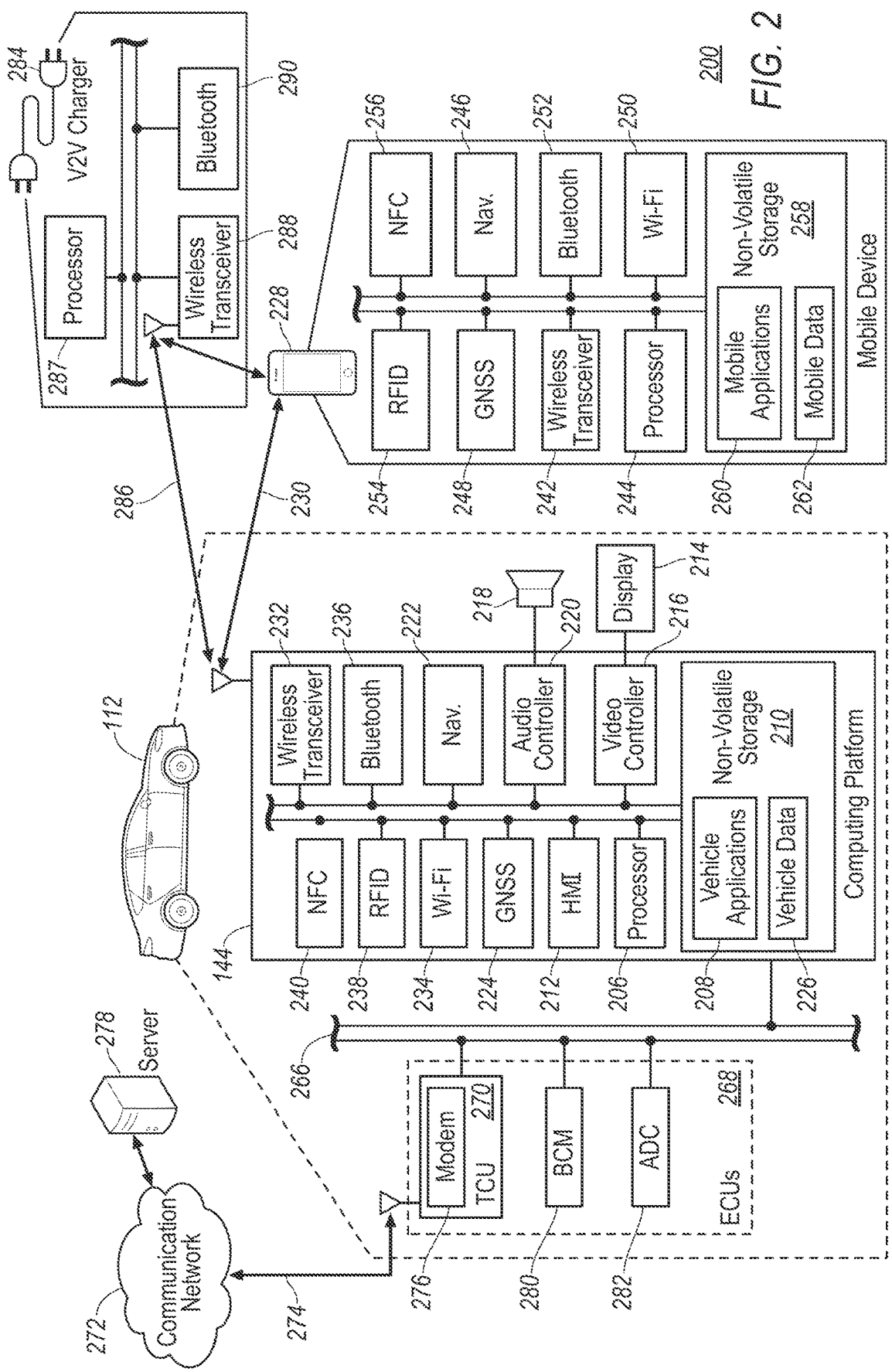
FIG. 2 is a block topology of a vehicle system illustrating the computing platform.

Referring to FIG. 2 an example schematic topology of the vehicle system is illustrated. The computing platform 144 may include one or more processors 206 configured to perform instructions, commands, and other routines in support of the processes described herein. For instance, the computing platform 144 may be configured to execute instructions of vehicle applications 208 to provide features such as navigation, remote controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (tangible medium) that participates in providing instructions or other data that may be read by the processor 206 of the computing platform 144. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 144 may be provided with various features allowing the vehicle occupants/users to interface with the computing platform 144. For example, the computing platform 144 may receive input from HMI controls 212 configured to provide for occupant interaction with the vehicle 112. As an example, the computing platform 144 may interface with one or more buttons, switches, knobs, or other HMI controls configured to invoke functions on the computing platform 144 (e.g., steering wheel audio buttons, a push-to-talk button, instrument panel controls, etc.).

The computing platform 144 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. The computing platform 144 may also drive or otherwise communicate with one or more speakers 218 configured to provide audio output and input to vehicle occupants by way of an audio controller 220.

The computing platform 144 may also be provided with navigation and route planning features through a navigation controller 222 configured to calculate navigation routes responsive to user input via for example the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one the vehicle applications 208.

The computing platform 144 may be configured to wirelessly communicate with a mobile device 228 of the vehicle users/occupants via a wireless connection 230. The mobile device 228 may be any of various types of portable computing devices, such as cellular phones, tablet computers, wearable devices, smart watches, smart fobs, laptop computers, portable music players, or other device capable of communication with the computing platform 144. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, a ultra-wide band (UWB) controller (not shown), and be configured to communicate with a compatible wireless transceiver 242 of the mobile device 228.

The mobile device 228 may be provided with a processor 244 configured to perform instructions, commands, and other routines in support of the processes such as navigation, telephone, wireless communication, and multi-media processing. For instance, the mobile device 228 may be provided with location and navigation functions via a navigation controller 246 and a GNSS controller 248. The mobile device 228 may be provided with a wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 144 and with one or more servers 278 using a communication network 272 through a wireless connection (not shown). The wireless connection may be in the form of various networks, e.g., a cellular network. The mobile device 228 may be further provided with a non-volatile storage 258 to store various mobile application 260 and mobile data 262.

The computing platform 144 may be further configured to communicate with various components of the vehicle 112 via one or more in-vehicle network 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 144 may be configured to communicate with various ECUs 268 of the vehicle 112 configured to perform various operations. For instance, the computing platform 144 may be configured to communicate with a TCU 270 configured to control telecommunication between vehicle 112 and a communication network 272 through a wireless connection 274 using a modem 276. The wireless connection 274 may be in the form of various networks, e.g., a cellular network. Through the communication network 272, the vehicle may access one or more servers 278 to access various content for various purposes. It is noted that the terms communication network and server are used as general terms in the present disclosure and may include any computing network involving carriers, router, computers, controllers, circuitry or the like configured to store data and perform data processing functions and facilitate communication between various entities. The ECUs 268 may further include a vehicle body control module (BCM) 280 configured to control body operations of the vehicle 112 such as doors lock/unlock, windows up/down or the like. The ECU 268 may further include an autonomous driving controller (ADC) 282 configured to provide autonomous driving features to the vehicle 112.

A V2V charger (charging cable) 284 may be provided with the vehicle 112 to facilitate electric power transactions between the vehicle 112 and a fleet vehicle (not shown). The vehicle 112 may operate as a donor vehicle to supply electric power from the traction battery 124 to a receiver vehicle via the V2V charger 284. Additionally, the vehicle 112 may operate as a receiver vehicle to receive electric power from a donor vehicle via the V2V charger 284. The V2V charger 284 may be provided with a processor 287 configured to perform instructions, commands, and other routines in support of the processes such as V2V charging. The V2V charger 284 may communicate with the vehicle 112 as well as the mobile device 228 via a wireless transceiver 288 using compatible wireless protocols. For instance, the wireless transceiver 288 may be configured to communicate with Bluetooth controller 290 to enable BLE communication with the vehicle 112 and the mobile device 228.

Figure 3:
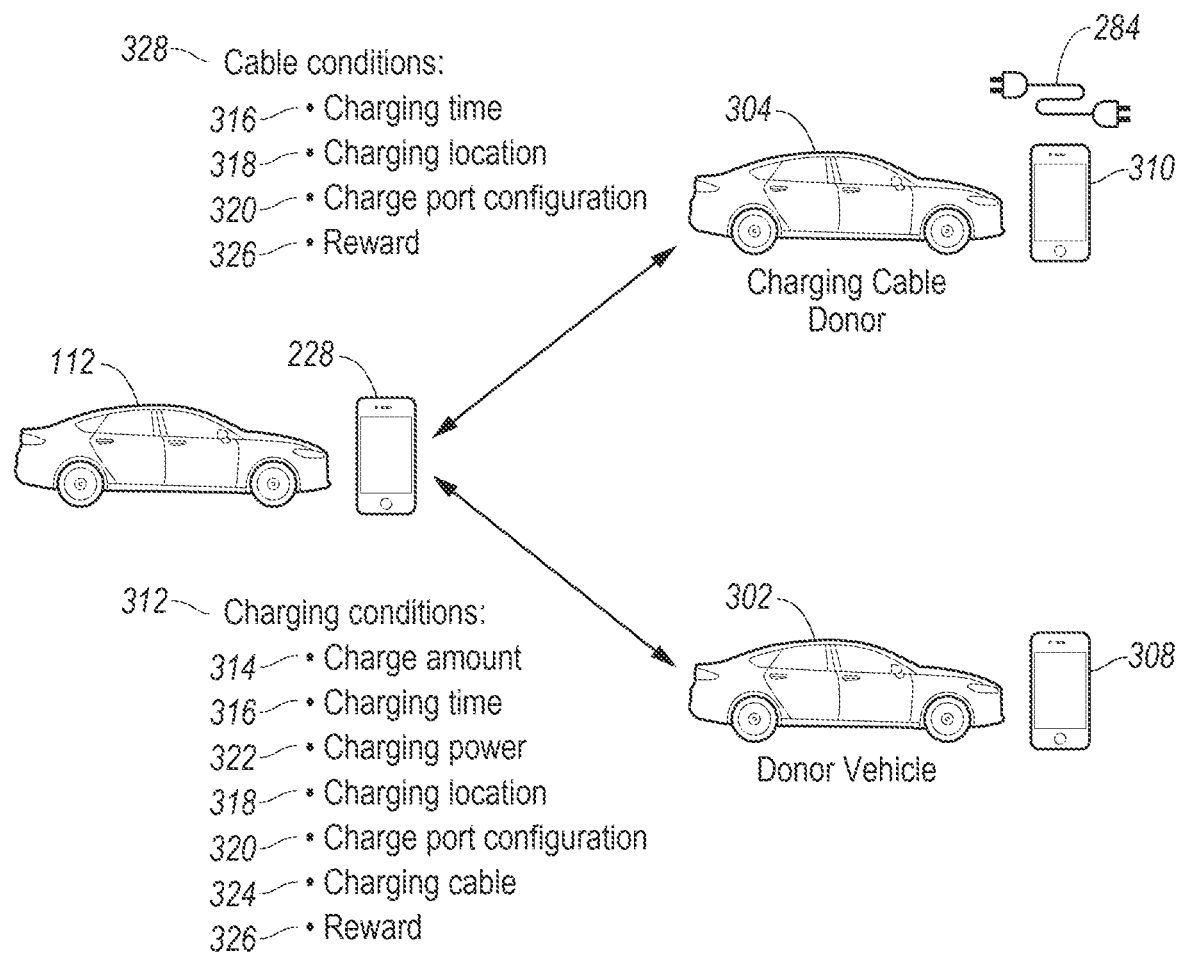
FIG. 3 is a schematic diagram of the vehicle-to-vehicle charging system.

Referring to FIG. 3, an example schematic diagram of the vehicle-to-vehicle-charging system of one embodiment of the present disclosure is illustrated. With continuing reference to FIGS. 1 and 2, the vehicle 112 operates as a receiver vehicle in the present example. The receiver vehicle 112 receives electric charge from a donor vehicle 302. A V2V charger donor (charging cable donor) vehicle 304 may be presented to supply the charging cable 284 to enable the charging between the donor vehicle 302 and the receiver vehicle 112. Each of the donor vehicle 302 and the charging cable donor vehicle 304 may be further associated with a mobile device 308 and 310 to facilitate the communications although the communications may be implemented via the vehicles 112, 302 and 304 alone without the need of the mobile devices 228, 308 and 310. The communication link between the receiver vehicle 112 and the donor vehicle 302/charging cable donor 304 may be implemented in various manners. For instance, the communication may be implemented via the server 278 through the communication network. Additionally or alternatively, the communication may be implemented via direct links such as Bluetooth, cellular vehicle-to-everything (CV2X), dedicated short-range communications (DSRC) or the like.

Responsive to detecting a state-of-charge (SOC) of the traction battery 124 being below a predetermined threshold (e.g., the receiver vehicle 112 may not be able to reach the nearest charging station based on the current location received by the GNSS controller 224), the receiver vehicle 112 may generate a V2V charging conditions 312 and identify the donor vehicle 302 to supply the electric charge. The receiver vehicle 112 may communicate the charging conditions to the donor vehicle 302 and ask for assistance subject to the approval of the donor vehicle 302. The charging conditions 312 may include various entries. For instance, the charging conditions 312 may include an amount of charge that the receiver vehicle 112 needs to reach the destination. If the destination is 40 miles away and the current distance-to-empty (DTE) is 15 miles, the receiver vehicle 112 will need at least 25 miles worth of charge from the donor vehicle. The specific amount of electric charge may be calculated as an entry of the charging conditions. The receiver vehicle 112 may further add a safe margin to the charging amount (e.g., an extra 10 miles) to increase the robustness of the system. The charging conditions may further include a charging time limit based on information such as a calendar of the user. For instance, if the user has an appointment at the destination in 1 hour, and it takes 40 minutes to drive to the destination, the charging time may be limited to 20 minutes maximum. The charging condition 312 may further include a charging location that may commonly be available for both the donor vehicle 102 and the receiver vehicle 112. The charging location 318 may be the current location of the donor vehicle 102 and/or the receiver vehicle 102. Alternatively, the charging location 318 may be a meetup location (e.g., a parking lot) for both the donor vehicle 302 and the receiver vehicle 112. The charging conditions 312 may further include charge port configurations 320 for both the donor vehicle 302 and the receiver vehicle 112 indicative of the V2V charging compatibility between the vehicles. The charging conditions 312 may further include a charging power 312 determined based on the charge amount and charging time. A charging cable requirement 324 may be determined using the charging power 322 and the charge port configuration 320 and communicated between the receiver vehicle 112 and the donor vehicle 302. The charging conditions may further include a reward that is offered to the donor vehicle 302 by the receiver vehicle 112. The reward may include service credits, digital currency or the like. The charging conditions 312 may be sent from the receiver vehicle 112 to the donor vehicle 302 as part of the request for assistance. Responsive to the approval by the user of the donor vehicle, the V2V charging may proceed. Additionally or alternatively, the system may allow the user of the donor vehicle to alter one or more of the charging conditions 312 to make a counter-offer to the receiver vehicle 112. For instance, if the proposed charging time 316 is unacceptable to the donor vehicle, the donor vehicle user may shorten the charging time 316 subject to the approval from the receiver vehicle 112.

If either the donor vehicle 302 or the receiver vehicle 112 detects a compatible charging cable 284 is present (e.g., in the trunk of either vehicle), the vehicles may proceed with the V2V charging. Otherwise, if neither of the vehicles 112 and 302 has the charging cable meeting the charging cable requirement 324, the receiver vehicle may be further configured to identify the charging cable donor vehicle 304 and ask to borrow the charging cable 284 therefrom. The receiver vehicle 112 may send a request to borrow the charging cable to the charging cable donor vehicle 304. The request may include cable conditions 328 including entries such as the charging time 316, charging location 318, charge port configuration 320, and reward 326 subject to the approval from the user of the charging cable donor vehicle 304. Similar to the donor vehicle 302, the charging cable donor 304 may be allowed to alter the cable conditions 328 and make a counter-offer.

Figure 4:
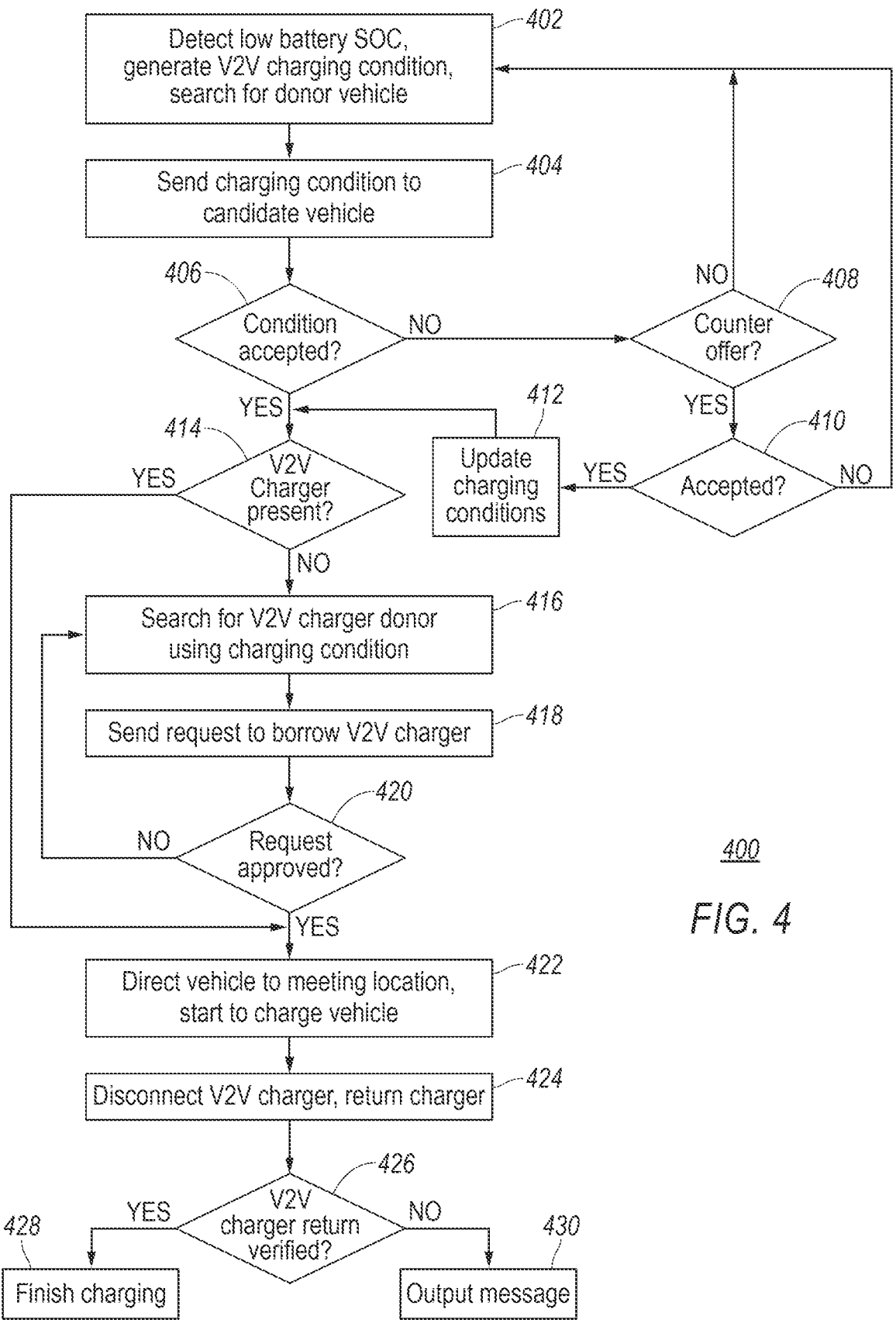
FIG. 4 is a flow diagram of a process for vehicle-to-vehicle charging.

Referring to FIG. 4, an example flow diagram of a process 400 for the vehicle-to-vehicle-charging of one embodiment of the present disclosure is illustrated. With continuing reference to FIGS. 1-3, the process 400 in the present example may be implemented via one or more controllers of the vehicle 112 and/or the mobile device 228 individually or collectively. For simplicity purposes, the following description will be made with reference to the computing platform 144 of the vehicle 112. At operation 302, the computing platform 144 detects that a state-of-charge (SOC) of the traction battery 124 is below a predetermined threshold and the vehicle 112 may not be able to reach the nearest charging station based on the current location received by the GNSS controller 224. Therefore, roadside assistance such as a V2V charge as a receiver vehicle is needed to allow the vehicle 112 to reach a destination (e.g., a charging station, or home). In response, the computing platform 144 generates the V2V charging conditions 312 as described above and searches for a candidate donor vehicle 302 to supply the electric charge. One or more candidate donor vehicles may be identified via the server 278. Additionally or alternatively, the candidate donor vehicles 302 may be directly detected by the receiver vehicle 102 via one or more direct wireless connections through the wireless transceiver 232 and/or the TCU 276 or the like. Responsive to the detection of the candidate vehicles 302, the computing platform 144 may ask the user to select one of the candidates to reach out to. Responsive to a user input selecting one of the candidates, the computing platform 144 reaches out to the selected candidate donor vehicle 302 by sending the charging conditions 312 to the candidate and/or the mobile device 308 associated with the candidate vehicle 302 and asks for approval. The charging conditions 312 may be provided to the user of the candidate donor vehicle 302 for approval. For instance, the charging conditions 312 may be presented to the mobile device 308 associated with the candidate donor vehicle 302 and provide the user with options to approve or decline the V2V charging request. If the request is approved, the process proceeds to operation 414. Otherwise, the process proceeds to operation 408. The user of the candidate donor vehicle 302 may be provided with an option to alter the charging conditions to make a counter-offer to the receiver vehicle 112. If no counter-offer is made and the user of the candidate donor vehicle 302 directly declines the request, the process returns to operation 402 to search for other candidate vehicles. Otherwise, at operation 408, if the computing platform 144 detects a counter-offer is received, the system may present the counter-offer to the user of the receiver vehicle 112 and the process proceeds to operation 410. Responsive to a user input indicative of a rejection to the counter-offer, the process returns to operation 402. Otherwise, responsive to a user input indicative of an acceptance to the counteroffer, the process proceeds to 412 to update the charging conditions 312 using the conditions set forth in the counteroffer and the process proceeds to operation 414 to verify if a charging cable 284 that meets the charging conditions 312 is present in either of the receiver vehicle 112 or the donor vehicle 302.

If the answer for operation 414 is a yes, indicative of a compatible charging cable 284 being present in either vehicle, the process proceeds to operation 422. Otherwise, the process proceeds to operation 416 and the computing platform 144 searches for a charging cable donor vehicle 304 having the compatible charging cable 284 using the cable conditions 328 as described above with reference to FIG. 3. The search operation may be similar to operation 402 in general. At operation 418, responsive to identifying a candidate charging cable donor 304, the computing platform 144 sends a request to borrow the charging cable 284 to the candidate charging cable donor 304. The request includes the cable conditions 328 to allow the candidate charging cable donor 304 to make an informed decision. If the request is declined, the process returns from operation 420 to operation 416. Otherwise, responsive to a user approval to the request to borrow the charging cable 284, the process proceeds to operation 422 and the computing platform 144 directs the vehicle to the charging location 318 to proceed with the V2V charging. The computing platform 144 may set the charging location 318 as the navigation destination via the navigation controller 222. Additionally, if the vehicle 112 is provided with autonomous driving features, the computing platform 144 may further automatically drive the vehicle 112 to the charging location 318 via the ADC 282. Upon all of the receiver vehicle 112, donor vehicle 302, and the charging cable donor 304 (if applicable) arriving at the charging location 318, the V2V charging may be performed. At operation 424, responsive to completion of the V2V charging session, the computing platform 144 may output a message to ask the user to disconnect the charging cable 284 and return the charging cable 284 to its original location (e.g., the charging cable donor vehicle 304). The location of the charging cable 284 may be monitored via the wireless connections between the charging cable 284 and the vehicles (as well as the mobile devices) involved in the V2V charging process. For instance, the charging cable donor vehicle 304 may detect if the charging cable 284 has been returned to the trunk using a BLE link via the wireless transceiver 288. Responsive to detecting the charging cable 284 has been returned at operation 426, the process proceeds to operation 428 to finish the charging process. Otherwise, the process proceeds to operation 430 to output a message to remind the user to return the charging cable 284. In an example, the computing platform 114 may be configured to prohibit the receiver vehicle 112 from starting and/or driving until the charging cable 284 is returned.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a traction battery; and
   a controller programmed to
   responsive to detecting a state-of-charge of the traction battery being less than a threshold, send a charge request defining a charge location to a charge donor vehicle for vehicle-to-vehicle charging,
   responsive to not detecting a charge cable that satisfies the charge request in the vehicle and the charge donor vehicle, send a borrow request including the charge location to a charge cable donor vehicle, and
   responsive to confirmation from the charge donor vehicle and charge cable donor vehicle, direct the vehicle to drive to the charge location.

2. The vehicle of claim 1, wherein the controller is further programmed to direct the vehicle to autonomously drive to the charge location.

3. The vehicle of claim 1, wherein the controller is further programmed to, responsive to receiving from the charge donor vehicle a counteroffer proposing to modify the charge request, modify the charge request.

4. The vehicle of claim 1, wherein the controller is further programmed to, responsive to detecting the charge cable being returned to the charge cable donor vehicle, permit activation of the vehicle.

5. The vehicle of claim 1, wherein the charge request includes a charge amount, a charge time, and a charge port configuration for the vehicle and the charge donor vehicle.

6. The vehicle of claim 5, wherein the charge request further includes a charge cable requirement.

7. A method comprising:
   sending a charge request defining a charge location to a charge donor vehicle for vehicle-to-vehicle charging;
   sending a borrow request including the charge location to a charge cable donor vehicle for charge cable acquisition;
   receiving confirmation that the charge request and borrow request have been accepted; and
   directing a vehicle to drive to the charge location.

8. The method of claim 7, wherein the sending the charge request is responsive to detecting a state-of-charge of a traction battery being less than a threshold.

9. The method of claim 7, wherein the sending the borrow request is responsive to not detecting a charge cable that satisfies the charge request in the vehicle and the charge donor vehicle.

10. The method of claim 7, wherein the directing includes autonomously driving the vehicle to the charge location.

11. The method of claim 7 further comprising modifying the charge request responsive to receiving from the charge donor vehicle a counteroffer proposing to modify the charge request.

12. The method of claim 7 further comprising permitting activation of the vehicle responsive to detecting the charge cable being returned to the charge cable donor vehicle.

13. The method of claim 7, wherein the charge request includes a charge amount, a charge time, and a charge port configuration for the vehicle and the charge donor vehicle.

14. A power system for a vehicle, comprising:
    a controller programmed to send a charge request defining a charge location and a charge cable requirement to a charge donor vehicle for vehicle-to-vehicle charging, send a borrow request to a charge cable donor vehicle after acceptance of the charge request by the charge donor vehicle and indication of lack of availability of a charge cable that can satisfy the charge cable requirement, and direct the vehicle to drive to the charge location after acceptance of the borrow request by the charge cable donor vehicle.

15. The power system of claim 14, wherein the controller is further programmed to send the charge request responsive to detecting a state-of-charge of a traction battery of the vehicle being less than a threshold.

16. The power system of claim 14, wherein the controller is further programmed to direct the vehicle to autonomously drive to the charge location.

17. The power system of claim 14, wherein the controller is further programmed to permit activation of the vehicle after receiving indication that the charge cable has been returned to the charge cable donor vehicle.

18. The power system of claim 14, wherein the charge request includes a charge amount, a charge time, and a charge port configuration.

* * * * *